3,348,956
REFRACTORY FIBER COMPOSITION
Wendell Graydon Ekdahl, Martinsville, N.J., assignor to Johns-Manville Corporation, New York, N.Y., a corporation of New York
No Drawing. Filed Dec. 30, 1965, Ser. No. 517,820
4 Claims. (Cl. 106—65)

ABSTRACT OF THE DISCLOSURE

A high temperature stable alumina-silica refractory composition of improved fiberizing characteristics comprising manganese dioxide.

This invention relates to refractory fibers, and in particular to a novel refractory fiber composition of high thermal stability and which improves fiberization and the manufacture thereof.

Very high temperature refractory compositions are frequently difficult to form and/or fiberize due to their resistance to melting and in turn conversion into a workable melt for fiberization. Moreover, the formation of long, fine diameter fibers relatively free of shot or non-fibrous matter, a typical and a preferred form for effective thermal insulating properties, through conventional fiberizing means comprising, for example, directing a high velocity impinging stream of gas such as steam or combustion products against a thin stream of a melt of the refractory material or by applying such a stream of the refractory melt upon one or a system of rapidly rotating discs, entails the producing and maintenance of melts of suitable temperature ranges and viscosities during forming periods to enable effective forming and attenuation of the melt coupled with prompt solidification thereof to fiberize the same into fine discrete fibrous masses of effective insulating properties.

Fibrous, high temperature refractories are frequently produced from relatively pure blends of alumina and silica alone, or admixed with any one or a combination of modifying or fluxing metal oxides in a wide range of amounts up to about 30 to 40 or even 50% by weight, but more typically not in excess of about 10 to 20% by weight. The relatively pure and substantially all alumina and silica formulations, however, have very high melting points and as such require extreme temperatures and means to fiberize them. It has therefore been customary in the industry to include or formulate the alumina-silica batches with one or more modifying or fluxing oxides to temper the stringent fusing and fiberizing conditions for alumina and silica mixtures, for example, iron oxide, soda, barium oxide, calcia, magnesia, titania, zirconia, etc. To introduce significant and discernible improvements in the melt and/or fiberizing operation, these modifying agents typically must be included in appreciable proportions of at least 2 or 3% and normally in amounts up to about 10% or possibly higher. At such levels for effective production however, these fluxing oxides have been found to appreciably diminish the melting point of the fibrous composition as well as the effective working temperature limits of the insulating products produced therefrom and also to adulterate the composition. Moreover, some of these fluxing materials constitute potential aggressive or corrosive agents for the surrounding structures or materials, or contaminates in sensitive systems.

It is the primary object of this invention to provide a highly effective fusing and fiberizing beneficent agent or oxide for alumina and silica melt batches and compositions.

It is also a primary object of this invention to provide a high refractory alumina-silica composition which is substantially pure, having good thermal properties and yet is amenable to conventional fusing or melting and fiberizing conditions and means.

It is also an object of this invention to provide a novel composition which is highly refractory and facilitates melting and fusing of the composition and produces good melt properties conducive to good fiberization through conventional blowing or spinning techniques.

These and other objects and advantages of this invention will become more apparent from the hereinafter detailed description thereof.

This invention comprises the discovery of a refractory composition composed substantially entirely of alumina and silica in approximately like proportions by weight, containing minor amounts of manganese dioxide and the beneficent effect of this oxide upon the composition or the mutual interaction and cooperatively improved effects of the three oxides united within the specific proportions of this invention. Specifically this invention comprises the incorporation of only about 0.1 to about 2.0% $MnO_2$ by weight of the total composition into an otherwise substantially pure refractory consisting essentially of alumina and silica in ratios of about 35 to 55 $Al_2O_3$ and 44 to 60 $SiO_2$. Optimum proportions for maximum advantages under most melting and fiberizing conditions and in product properties consist of, in percent by weight, about 45 to 55 $Al_2O_3$, 45 to 55 $SiO_2$ and about 0.5 to 1.5 $MnO_2$ for example, approximately 50% $Al_2O_3$, 49% $SiO_2$ and 1% $MnO_2$.

The following comprises a specific illustration of a preferred and typical refractory fiber composition and means of producing the same of this invention and demonstrates the effects and utility thereof. It is to be understood that the specific proportions or formulations of ingredients and in particular the means and techniques of melting and fiberizing the melt are primarily exemplary and are not to be construed as limiting the invention to any particular source material or ratios thereof, except as otherwise set forth herein as the boundaries of this invention, or limiting the invention to the given means, conditions or apparatus of melting and fiberizing.

A typical aluminum silica refractory fiber melt formulation composed of approximately 52.5 pounds of alumina and 47.5 pounds of silica was modified with the addition of Morocan B manganese dioxide, calculated to provide about 1.5 pounds of $MnO_2$. This batch was rapidly melted at temperatures of about 3600° F. in a conventional electric arc furnace employed in the manufacture of aluminum silica refractory fiber. The $MnO_2$ modified batch melted readily and produced a melt which spun easily with a two rotor fiberizer system of typical construction and conditions facilely forming fine diameter fiber of less than about 3 microns and of conventional shot content for spun aluminum silica fibrous products. This fiber exhibited high temperature resistance and a Navy alkalinity of 0.

It is to be understood that the foregoing details are given for the purpose of illustration and not restriction and that variations within the spirit of the invention are to be included within the scope of the appended claims.

What I claim is:

1. An inorganic refractory fiber composition of high temperature stability and improved fiberizing characteristics formed by melting and fiberizing a batch of ingredients providing a formulation consisting essentially, in approximate percentage by weight, of:

| | Percent |
|---|---|
| Silica | 44–60 |
| Alumina | 35–55 |
| Manganese dioxide | 0.1–2.0 |

2. The inorganic refractory fiber composition of claim 1 wherein composition of the batch ingredients consists essentially, in approximate percentages by weight, of:

| | Percent |
|---|---|
| $SiO_2$ | 45–55 |
| $Al_2O_3$ | 45–55 |
| $MnO_2$ | 0.5–1.5 |

3. The inorganic refractory fiber composition of claim 1 wherein the composition of the batch ingredients consists essentially, in approximate percentages by weight, of:

| | Percent |
|---|---|
| $SiO_2$ | 49 |
| $Al_2O_3$ | 50 |
| $MnO_2$ | 1 |

4. The inorganic refractory fiber composition of claim 1 wherein the composition of the batch ingredients consists essentially in approximate percentages by weight of about 1% of manganese dioxide and substantially equal percentages of silica and alumina.

References Cited

UNITED STATES PATENTS

| 2,731,359 | 1/1956 | Nicholson | 106—65 |
| 3,081,179 | 3/1963 | Charvat et al. | 106—50 |

TOBIAS E. LEVOW, *Primary Examiner.*

J. E. POER, *Assistant Examiner.*